United States Patent [19]
Hearn et al.

[11] 3,728,612
[45] Apr. 17, 1973

[54] POWER SUPPLY AND TELEMETRY SYSTEM FOR OPTICAL MAGNETOMETERS

[75] Inventors: Daniel P. Hearn, William D. Hetherington, both of Richardson, Tex.

[73] Assignee: Atlantic Richfield Company, New York, N.Y.

[22] Filed: Aug. 27, 1971

[21] Appl. No.: 175,599

[52] U.S. Cl. ................................................. 324/.5 R
[51] Int. Cl. ............................................ G01r 33/08
[58] Field of Search .................... 324/.5 E, .5 F, .5 G

[56] References Cited

UNITED STATES PATENTS 3,513,383 5/1970 Hartline ............................. 324/.5 F
3,629,694 12/1971 Hearn et al .......................... 324/.5 F

*Primary Examiner*—Michael J. Lynch
*Attorney*—Blucher S. Tharp et al.

[57] ABSTRACT

An optical magnetometer, e.g. helium magnetometer, power supply and telemetry system for aerial surveying. One or more magnetometers are placed in aerodynamic devices and pulled behind an airplane by tow cable. Power to operate the magnetometers is supplied over the cables from a primary source in the airplane. The cables also carry a depumping signal from the airplane to the magnetometers and output signals from the magnetometers to the airplane.

6 Claims, 4 Drawing Figures

INVENTORS:
DANIEL P. HEARN
WILLIAM D. HETHERINGTON

ATTORNEY

INVENTORS:
DANIEL P. HEARN
WILLIAM D. HETHERINGTON

POWER SUPPLY AND TELEMETRY SYSTEM FOR OPTICAL MAGNETOMETERS

BACKGROUND OF THE INVENTION

This invention relates to an improvement in optical magnetometers and, more particularly, to an aerial survey system for obtaining both magnetic total field and magnetic gradient measurements.

A method frequently used in geophysical prospecting to determine the location of subterranean deposits of petroleum and/or other minerals is monitoring of the earth's magnetic field. To do this in an economic manner on a large scale, airborne techniques are frequently utilized. In general, these airborne techniques measure the earth's magnetic field with equipment mounted in an aerodynamic device, frequently termed a "bird," which is towed from an aircraft over the survey area. While a single such magnetometer can indicate changes in the ambient magnetic field, it is not possible to tell whether such changes are due to subterranean structures or deposits or whether they are naturally occurring time or diurnal variations.

By towing two magnetometers over the survey area, it is possible to determine whether changes in magnetic field intensity are the result of geophysical deposits or whether they are due to diurnal variations. In deriving the magnetic gradient, naturally occurring variations cancel so that any variation in the gradient can be assumed to reflect subterranean changes.

However, any method of magnetic gradient mapping is subject to error. The relative distance between the aircraft and the two birds, the angle of the aircraft relative to the birds, the position of the birds relative to each other, etc., can all affect the readings. This difficulty is compounded due to the fact that the two cables generally have high drag characteristics so that the birds are unstable and subject to abrupt changes in position. Moreover, because of the high drag, it is difficult to maintain the desired distance of separation between the birds.

For these reasons and others, magnetic gradient surveys have largely been unsuccessful to data and the industry has had to rely on total field surveys and their inherent inaccuracies due to diurnal variations.

BRIEF DESCRIPTION OF THE INVENTION

The present invention is directed to a system wherein the problems previously associated with flying dual magnetometers are eliminated or at least substantially reduced. In this system the birds are towed by a low drag, small diameter, single conductor cable. The low drag cable stabilizes the birds in flight and allows the operator to adjust their distance of separation while maintaining vertical sensor alignment.

In achieving this design, it was necessary to totally redesign the power supply and telemetry system for the magnetometer. To minimize weight of the birds, control, recording, and power supply components were kept in the airplane and only the magnetic detector and essential auxiliary equipment were located in the birds. The primary problem to be solved was how to simultaneously (1) provide power for the magnetometer, (2) return the detector signal from the bird to the airplane, and (3) transmit a depumping signal from the airplane to the detector, all over a single conductor. Means for accomplishing this and further details of the invention are given below.

The optical magnetometer system developed by Applicants comprises an airplane towing at least one aerodynamic body with a minimum diameter tow cable, a magnetic sensor located in the aerodynamic body, and power supply and control circuitry located in the airplane. The magnetic sensor includes a source of resonance radiation, an absorption cell containing optically excitable atoms capable of being transposed to a higher energy state, depumping means for deenergizing excited atoms, and a radiation detector for producing an electrical signal responsive to the radiation passing through the absorption cell. Power oscillator means located in the aerodynamics devices operates the radiation source. Power supply means in the airplane in turn provides power to the oscillator means.

A depumping signal is generated by a voltage controlled oscillator located in the airplane and transmitted over the tow cable to the depumping means. A phase detector located in the airplane receives the output signal from the radiation detector and compares it with a reference signal. An error signal is then applied to the voltage controlled oscillator to adjust the center frequency of the depumping signal. A sweep generator is located in the airplane to provide a sweep signal to the voltage controlled oscillator and a reference signal to the phase detector.

The power signal going from the power supply to the power oscillator is D.C.; the depumping signal going from the voltage controlled oscillator to the depumping means is on the order of 600–2,000 K Hz; and the detector signal going from the detector to the phase detector is approximately 500 Hz. All three of these signals can readily be carried simultaneously over a single conductor cable and separated from one another at both ends of the cable.

DETAILED DESCRIPTION OF THE INVENTION

Figure 1:
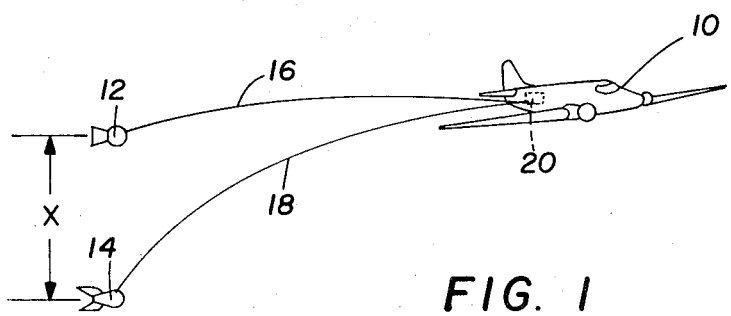
FIG. 1 schematically illustrates a geophysical survey flown using two magnetometers according to the invention.

Referring to FIG. 1, a survey system is shown utilizing two magnetometers. Airplane 10 flies at a predetermined height above the ground, e.g. from 500 to several thousand feet. When flying, airplane 10 drags aerodynamic bodies (birds) 12 and 14 by means of cables 16 and 18, respectively. Electrical equipment 20 schematically shown in airplane 10 electrically connects with magnetic detectors or sensors 22 and 24, FIG. 2, via cables 16 and 18. The construction of bird 12 is such that it has a high drag characteristic and flies essentially behind airplane 10, whereas the construction of bird 14 is such that there is minimum drag and it flies beneath airplane 10. The spacing X is the vertical separation between birds 12 and 14. The greater this distance, the greater the accuracy with which magnetic gradient measurements can be made.

Figure 2:
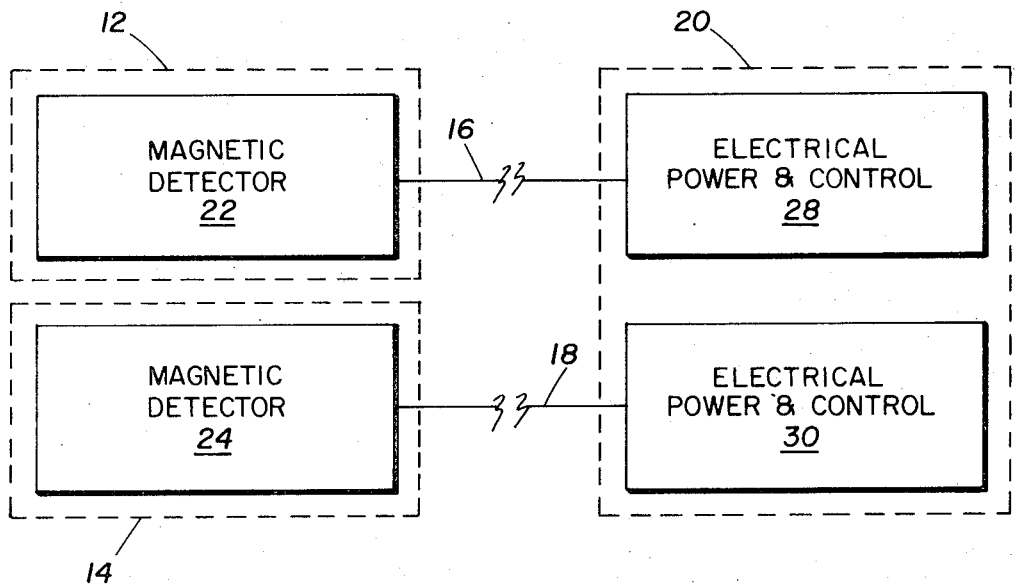
FIG. 2 is a block diagram representing the basic components of the magnetometer system carried in the airplane and birds, respectively.

Referring now to FIG. 2, birds 12 and 14 contain magnetic detectors 22 and 24, respectively, which are connected to individual electrical power and control supplies 28 and 30 by two cables 16 and 18, respectively. Detectors 22 and 24 are designed to concurrently measure the earth's magnetic field at two spaced apart points determined by the positions of birds 12 and 14 (FIG. 1). Knowing the distance of separation X and the respective absolute field readings, one can readily calculate the magnetic gradient. Gradient measurements are preferred for most exploration purposes since they are free from diurnal variations and are easier to interpret.

Power and control units 28 and 30 are located in airplane 10 remote from detectors 22 and 24 to minimize the effect of local magnetic fields and to reduce the weight of the birds. The ideal cable for connecting birds 12 and 14 to airplane 10 is a single conductor coaxial cable in order to minimize radiation of signals, prevent interference pickup, and hold down wind resistance. Desirably, the diameter of the tow cable would be less than about 0.15 inch since larger diameter cables will have undesirably high lift values. High lift makes it difficult to separate the birds by any appreciable distance and subjects them to abrupt variations in X.

Figure 3:
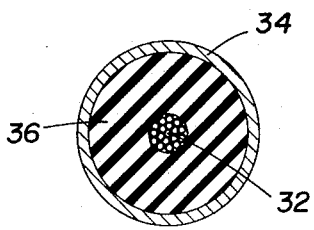
FIG. 3 is the cross-section of a single conductor tow cable suitable for towing the magnetometers.

The cross-section of a cable suitable for tow cables 16 and 18 is shown in FIG. 3. The cable is comprised of central conductor 32, external shield and stress member 34, and dielectric material 36. Conductor 32 is typically a multistrand copper wire and shield member 34 is a high strength, high conductivity, low magnetic metal braid such as phosphor bronze, beryllium copper, or possibly some forms of stainless steel. All electrical power and signals between the airplane and birds are provided over conductor 32 with shield 34 being used as a ground.

D.C. power is preferred for powering the magnetometers and will be used in the following explanation although low frequency (e.g. 50 Hz) power could be used in order to avoid the small magnetic pole caused by D.C. current flow in the tow cables. Also, the subsequent description will be directed toward a helium magnetometer system with the understanding that the invention is not so limited and other optically pumped magnetometers (e.g. cesium or rubidium) could equally well be used.

Figure 4:
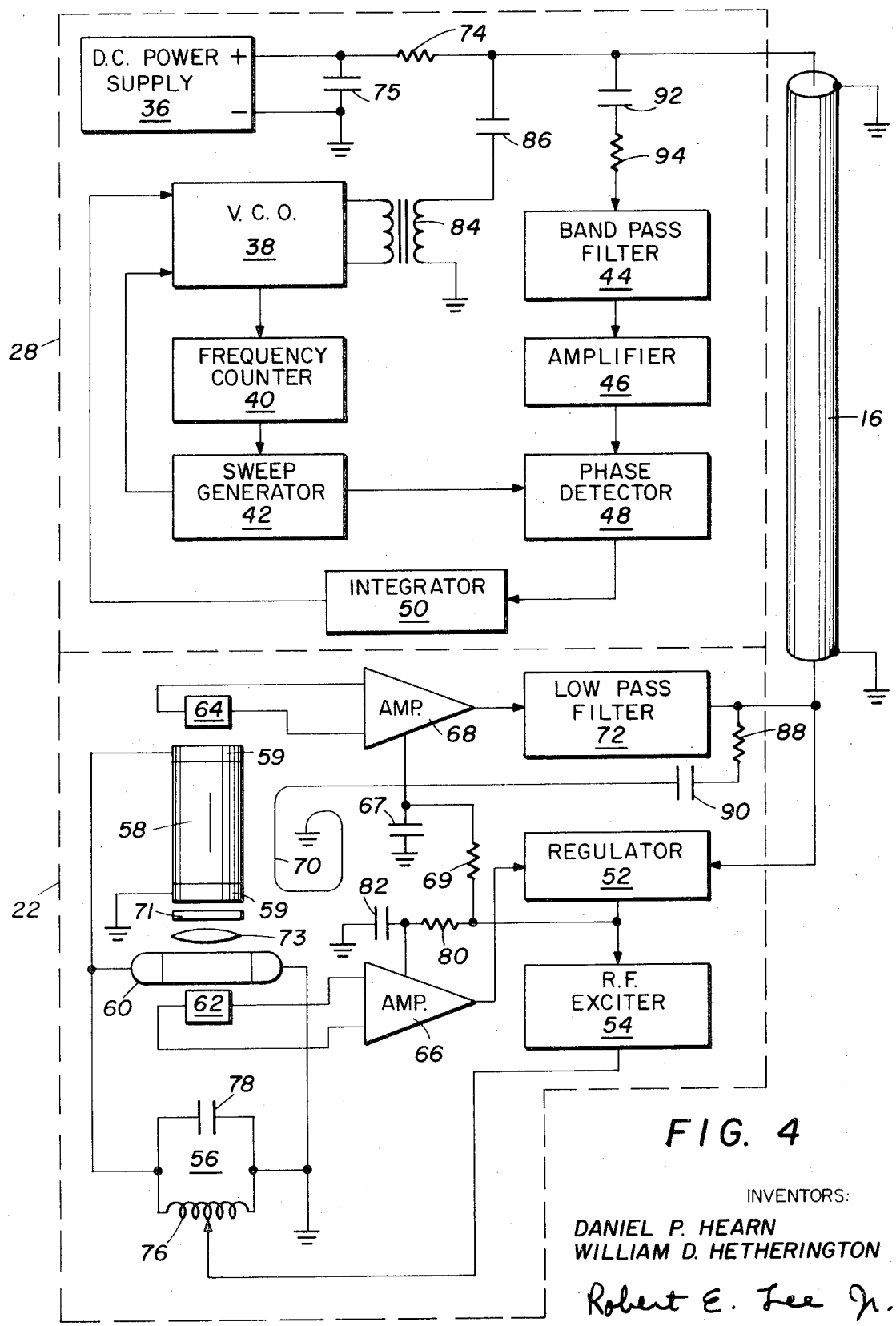
FIG. 4 is a detailed block diagram showing the electrical circuit and component diagram for the power and control unit and the magnetic detector for one of the magnetometers.

Referring to FIG. 4, an electrical circuit and component diagram is shown for electrical power and control unit 28 and magnetic detector 22 as utilized in a helium magnetometer. Components located in airplane 10 in power and controlled unit 28 include D.C. power supply 36, voltage control oscillator 38, frequency counter 40, sweep generator 42, band pass filter 44, amplifier 46, phase detector 48, and integrator 50. Components in bird 12 making up magnetic detector 22 include regulator 52, RF exciter 54, tuned circuit 56, absorption cell 58, exciter lamp 60, light detectors 62 and 64, amplifiers 66 and 68, depumping coil 70, circular polarizer 71, low pass filter 72, and lens 73.

The power required to operate detector 22 and its electronics is 24 volts D.C. at 500 ma. This is provided by means of power supply 36 connected to cable 16 through resistor 74. Capacitor 75 is connected between the positive and negative terminals of power supply 16 to remove any A.C. component. The D.C. input to detector 22 is stabilized by means of electronic regulator 52 which removes A.C. signals and controls the magnitude of the D.C. signal applied to R.F. exciter 54. The output from R.F. exciter 54 is applied to tuned circuit 56 which comprises inductor 76 and capacitor 78 connected in parallel. The output from tuned circuit 56 drives helium lamp 60 and energizes electrodes 59 on absorption cell 58. Light detector 62 detects the output of lamp 60 and provides a feedback signal which is applied to amplifier 66 and then used to control regulator 52. Amplifier 66 is powered by D.C. output from regulator 52 decoupled through resistor 80 and capacitor 82.

In addition to the D.C. power discussed above, operation of the helium magnetometer requires that a minimum of two A.C. signals be transmitted over cable 16. A frequency modulated depumping signal in the range of 600–2,000 K Hz generated by power and control unit 28 must be supplied to depumping coil 70. This signal is originated by voltage controlled oscillator 38 and is controlled by sweep generator 42. The output from oscillator 38 is applied to transformer 84 which provides a depumping signal which is applied to cable 16 via capacitor 86. After being transmitted over cable 16, the depumping signal is applied to depumping coil 70 by connection through resistor 88. Capacitor 90 is series connected to coil 70 to provide proper resonance frequency.

The other signal that must be carried by cable 16 is the output signal from light detector 64. Typically this signal will be about 500 Hz, can reverse phase, and has variable amplitude. The output signal from photocell 64 is passed through amplifier 68 which is powered by D.C. output from regulator 52 through decoupling resistor 69 and capacitor 67. The output from amplifier 68 goes to low pass filter 72 which connects to cable 16. Filter 72 is designed to have a very high attenuation at depumping frequencies in order to prevent them from appearing at the output of amplifier 68. At the aircraft end, the detector signal passes via capacitor 92 and resistor 94 to band pass filter 44 which has high rejection for frequencies in the depumping range. The output from filter 44 is then further amplified by amplifier section 46 and next introduced as one input to phase detector 48. Sweep generator 42 provides an input to phase detector 48 which is compared with the first signal. Phase detector 48 produced an error signal which goes to integrator 50 and then to voltage controlled oscillator 38 where it is used to adjust the center frequency of the depumping signal.

In operation, lamp 60 is energized by RF exciter 54 to radiate resonance radiation along a path through absorption cell 58 terminating at light detector 64. The radiation is collimated on cell 58 by lens 73 and polarized by circular polarizer 71. Helium gas in cell 58 is excited to a metastable state by means of a high frequency field generated by electrodes 59. The metastable helium atoms are capable of absorbing part of the radiation emitted by lamp 60 to move into other excited states. The depumping signal produced by voltage controlled oscillator 38 and applied to depumping coil 70 has the effect of de-energizing highly excited helium atoms so that they fall back to the metastable level. Light detector 64 monitors the output of radiation from lamp 60 and generates an output signal inversely proportional to the absorption of radiation by cell 58. This output signal is carried over cable 16 to phase detector 48 which generates an error signal that causes oscillator 38 to track the frequency of maximum absorption.

At the same time, sweep generator 42 provides a reference signal for phase detector 48 and causes oscillator 38 to alternately switch above and below the frequency of maximum absorption. The depumping frequency measured by frequency counter 40 at which absorption is maximized is indicative of the intensity of the magnetic field in which cell 58 is located. By concurrently performing similar operations as discussed above in respect to detector 22 and power and control unit 28 for magnetic detector 24, and power and control unit 30, FIG. 2, two distinct field readings can be obtained from which the magnetic gradient can be calculated.

It is understood that various changes in the details, materials, steps, and arrangements of parts, which have been herein described and illustrated in order to explain the nature of the invention, may be made by those skilled in the art within the principle and scope of the invention as expressed in the appended claims.

What is claimed is:

1. An optical magnetometer system for measuring the earth's magnetic field comprising,
   a. an aerodynamic body adapted to be towed by an airplane;
   b. a pair of electrical conductors interconnected between said aerodynamic body and the airplane;
   c. a magnetic sensor in said aerodynamic body, including,
      1. a source of resonance radiation,
      2. an absorption cell containing atoms excitable to a higher energy state by the radiation from said source,
      3. depumping means associated with said absorption cell for de-energizing atoms excited by the radiation, and
      4. a radiation detector for producing an electrical signal responsive to radiation emitted by said source and passing through said absorption cell;
   d. a power oscillator in said aerodynamic body for providing power to operate said source of resonance radiation;
   e. a d-c power supply in the airplane the d-c output of said power supply being connected to said pair of electrical conductors to provide power to said power oscillator;
   f. a voltage controlled oscillator in the airplane for generating a depumping signal which is transmitted over said pair of electrical conductors to said depumping means;
   g. a phase detector in the airplane for receiving the electrical signal produced by said radiation detector over said pair of electrical conductors and comparing it with a reference signal; and
   h. a sweep generator in the airplane for providing a sweep signal to said voltage controlled oscillator and a reference signal to said phase detector.

2. An optical magnetometer system according to claim 1 further comprising at least a second aerodynamic body, each of which contains a magnetic sensor.

3. An optical magnetometer system according to claim 1 where coupling means are connected at both ends of said pair of electrical conductors to isolate said electrical signal produced by said radiation detector from the signal of said depumping means.

4. An optical magnetometer system according to claim 1 where said phase detector produces an error signal that controls the center frequency of said depumping signal.

5. An optical magnetometer system according to claim 1 where said optically excitable atoms are helium atoms.

6. An optical magnetometer system according to claim 1 wherein said pair of electrical conductors is a single conductor coaxial cable.

* * * * *